April 14, 1953 W. ROBINSON 2,634,949
ROTARY VALVE WITH INDEXING AND LOCKING DEVICES
Filed Nov. 25, 1947 5 Sheets-Sheet 1

Inventor
*William Robinson*

Inventor
*William Robinson*

April 14, 1953 W. ROBINSON 2,634,949
ROTARY VALVE WITH INDEXING AND LOCKING DEVICES
Filed Nov. 25, 1947 5 Sheets-Sheet 4

Inventor
William Robinson
By Cushman, Darby & Cushman
Attorneys

April 14, 1953     W. ROBINSON     2,634,949
ROTARY VALVE WITH INDEXING AND LOCKING DEVICES
Filed Nov. 25, 1947     5 Sheets-Sheet 5

Fig. 15
PARTIAL FLOW

Fig. 16
FULL ON

Fig. 17
LIMIT REDUCED FLOW

Inventor
William Robinson
By Cushman, Darby & Cushman
Attorneys

Patented Apr. 14, 1953

2,634,949

UNITED STATES PATENT OFFICE 2,634,949

ROTARY VALVE WITH INDEXING AND LOCKING DEVICES

William Robinson, Chicago, Ill., assignor, by mesne assignments, to Certified Gas Equipment Corporation, Mansfield, Ohio, a corporation of Ohio Application November 25, 1947, Serial No. 787,911

8 Claims. (Cl. 251—163)

The present invention relates to valves and, more particularly, to valves for gas appliances.

An object of the invention is to provide valve operating means which are economical in manufacture and convenient to operate.

A further object of the invention is to provide a valve assembly which includes efficient locking means.

Another object is to provide a valve assembly wherein the limits of valve movement can be readily adjusted.

A further object of the invention is to provide means to indicate when a valve is in a predetermined position.

Another object is to provide novel means whereby a valve element can be connected to an operating shaft.

A further object is to provide means to secure an operating handle to a valve shaft.

Still another object of the invention is to provide a valve assembly and valve operating means which can be readily interchanged to meet various operating requirements.

Another object of the invention is to provide a disc valve which will efficiently and safely control the flow of gas or other fluid.

A further object is to provide a valve of such design that close tolerances required in use, including use with high B. t. u. gas, can be met without undue increase in the cost of the valve.

A still further object is to provide a novel method and mechanism for producing valve passages.

Other objects and advantages of the invention will be apparent from the following specification and drawings wherein.

The illustrative embodiments of the invention disclosed herein include four operating arrangements or means for rotary valve members and also includes novel rotary valve members and valve bodies. By one operating arrangement, a valve member simply will be limited in movement between non-flow and full-flow positions. This type is hereinafter referred to as a "single purpose non-locked valve." A second type is similar to the first type, but includes means whereby it can be locked in "off" position. This second type is hereinafter referred to as a "single purpose locked valve." A third type, hereinafter termed a "high-low, non-locked valve," is not locked in any position but gives an indication when the valve has been moved to a predetermined position, for example, full-flow position. A fourth type, hereinafter referred to as a "high-low, locked valve," includes means to lock it in one position, as well as means to indicate another position. These four forms are hereinafter separately discussed but, for better understanding, a valve body and rotary valve member which may be used with the illustrated operating means will first be described.

Figures 1, 2, 3:
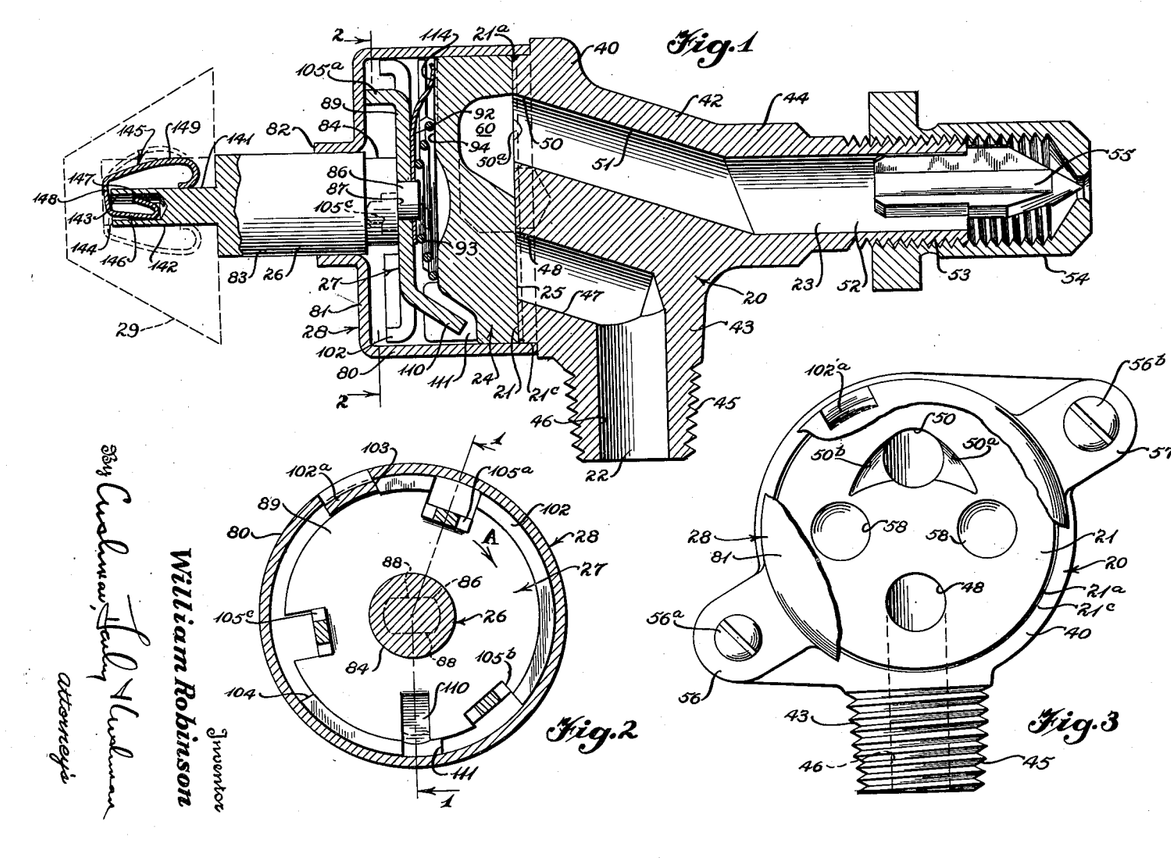
Figure 1 is a central longitudinal section through a valve of the present invention in closed position, with parts in elevation, the section being taken on the line 1—1 of Figure 2.
Figure 2 is a transverse section on the line 2—2 of Figure 1.
Figure 3 is an elevation of the seat face of the valve body of the invention, the view also showing fragments of the valve cover illustrated in Figure 1.

Referring to Figures 1 to 3, an entire assembly such as shown in these figures comprises a stationary valve body 20 which includes a seat face 21 to which a gas supply passage 22 and a gas outlet or delivery passage 23 open. A rotary disc valve member 24 including a seat face 25 is positioned on the seat face 21 of the body 20. Valve member 24 is adapted to be rotated with respect to the valve body by means of a stem 26 operatively connected to the rear face of the valve by the various forms of operating mechanism disclosed herein, that disclosed in Figures 1 and 2 being generally designated 27. Stem 26 forms part of the operating mechanism 27 and is journalled in a central flange of cover 28 for rotation by a handle 29 shown in dotted lines in Figure 1.

Figures 13, 14:
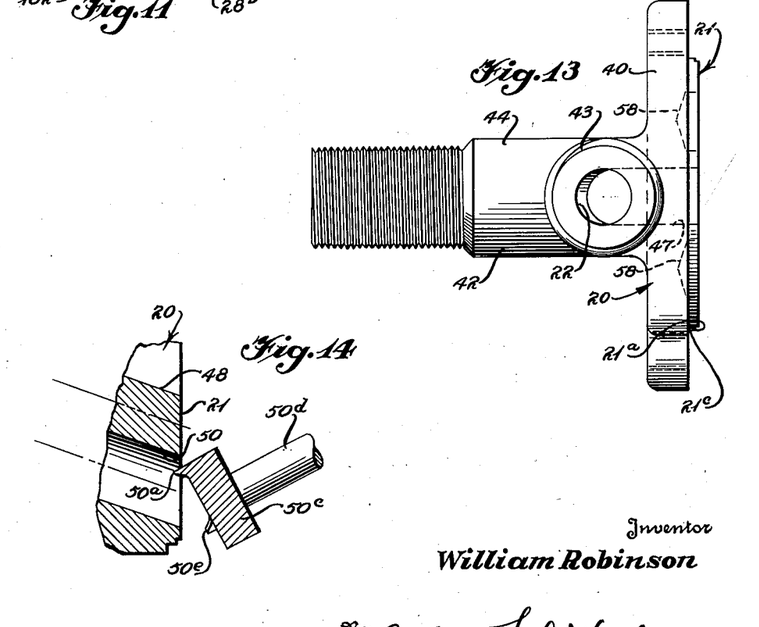
Figure 13 is a detailed view of the valve body of Figure 1, the view looking toward Figure 1 from the bottom.
Figure 14 is a view diagrammatically illustrating a method of forming valve passages.

Valve body of Figures 1, 3 and 13

The valve body 20 includes a disc-like portion 40 shown in edge elevation in Figure 13 and the peripheral outline of which is shown in Figure 3. The seat face 21 is formed on the front of this disc portion. As shown in Figure 13, which is a view looking toward the bottom of Figure 1 or 3, an extension 42 projects rearwardly from the disc portion 40, this rearward extension including a radially projecting portion 43 (Figure 3) and a central portion 44. The radial extension 43 is threaded as indicated at 45 in Figure 1 so that it may be fitted to the manifold of a gas range. The gas supply passage 22 extends through this portion and to the seat face 21. In more detail, as shown in Figure 1, the supply passage 22 comprises an outer and radially extending portion 46 which opens to an inner portion 47 which extends at an angle of about 72° to the axis of the disc and opens to the seat face 21 through a supply port 48. It will be observed that the angle between the radial passage portion 46 and the inner passage portion 47 is about 108°, this angle enabling the gas flow to change direction without undue restriction.

As is also shown in Figure 1, the delivery supply passage 23 is in the rearward and central extension 42 and includes a port 50 which opens to an inner passage portion 51 which extends through the central rearward projection 44 along a line parallel to the inner portion 47 of the supply passage 22, viz., at an angle of about 72° with respect to the seat face 21. Passage portion 51 then opens to an outer passage portion 52 which is substantially concentric with the axis of the disc portion 40. The angle between the portions 51 and 52 is about 162°, preventing undue restriction to the gas flow.

The outer end of the rearward and central extension 44 may be threaded as indicated at 53 to receive the usual nipple 54 adapted to project into the gas inlet of a gas and air mixing tube. Any well known type of vaned element 55 may be fitted in the outlet of the delivery passage 23 to cooperate with the nipple and thereby permit adjustment of the outlet flow. Alternatively, the outer end of extension 44 may be fitted with a packing gland and clamping nut.

As best shown in Figures 1 and 3, the valve body 20 has ears 56 and 57 projecting radially therefrom and adapted to receive correspondingly apertured ears on the casing 28. The ears 56 and 57 are provided with apertures, each of a different size, so that the casing, valve member, and valve operating device can be properly oriented thereon. As best shown in Figure 3, the ears 56 and 57 are arranged along a diametrical line which extends at an acute angle with respect to the radial projection 43. Because of this, two valve bodies 20 may be positioned closer together on a manifold than would be the case if the ears were arranged on a line extending at right angles to the radial projection 43.

Seat face 21 has a recessed periphery as indicated at 21a in Figure 1. If a burr is formed during grinding of face 21 it will lie in this recess and cannot be forced over on to the seat face during fitting of casing 28 upon the body 20.

As is best shown in Figure 3, the delivery port 50 of valve body 20 is provided with tail ports 50a and 50b respectively extended from opposite sides thereof. The tail ports extend along arcuate lines from port 50 and are of gradually decreasing V-shaped section. As is hereinafter explained, the purpose in providing two oppositely extending tail ports is to enable the valve body to be used with valve elements designed to rotate clockwise, as well as valve elements adapted to rotate counterclockwise.

Figure 14 discloses a method of forming the tail ports 50a and 50b involving the use of a milling cutter 50c including cutting teeth 50e, the cutter being rotatable upon a shaft 50d. As will be clear from Figure 14, the axis of shaft 50d is at an acute angle, for example, 65°, to the plane in which the port 50 lies, viz., the plane of the seat face 21. Hence, rotation of the tool 50c will cause the two tail ports to be simultaneously formed as either the cutting tool of the valve body is advanced. The cutting edge or the tool 50c is of such section as indicated in Figure 14 that it will produce tail ports V-shaped at about 50° in section and of substantial depth adjacent the port 50, which depth decreases to zero at a point spaced from the port 50. The tool 50c is preferably a milling cutter but may be some other type of cutting or grinding tool.

Formation of tail ports by this method, rather than in the casting of the valve body, insures that the tail ports will be perfectly smooth and free of burrs, a matter of extreme importance in connection with the use of bottled or other high B. t. u. gas.

As is best shown in Figures 3 and 13, the seat face 21 of valve body element 20 is provided with two lubricant pockets 58 positioned on a diametrical line extending at right angles to the line on which the supply and delivery ports 48 and 50 are arranged. It will be observed from Figure 3 that the pockets 58 have their centers on the same circular line on which the ports 48 and 50 lie so that the pockets will thereby be engaged by any passage in a rotatable valve element which is in circular alignment with the mouths of the ports.

As is best indicated in Figure 13, the pockets 58 are of substantial depth and hence will receive sufficient lubricant to keep the seat face lubricated for a long period of time.

In use, one pocket 58 will be filled with grease, viz., the pocket which is distant from the tail port which will actually be used. For example, when the valve body is to be used with a rotatable element turning clockwise with respect to Figure 3 and which valve element will thereby cooperate with the tail port 50a, lubricant will only be placed in the pocket 58 shown at the left of Figure 3. The reason for this is as follows: In the final testing of an assembled valve of the present invention, compressed air is blown through the valve passages and it is found that if the pocket immediately adjacent the used tail port is filled with grease, some of the grease will be forced between the contacting seating surfaces and into the tail port. The result is that that tail port is thereby restricted as to gas flow. By making the pockets of adequate size and depth, sufficient lubricant can be stored in a single pocket. However, the provision of two pockets enables the valve body to be used with valve elements adapted to turn in either one direction or another.

The disc valve

Figure 18:
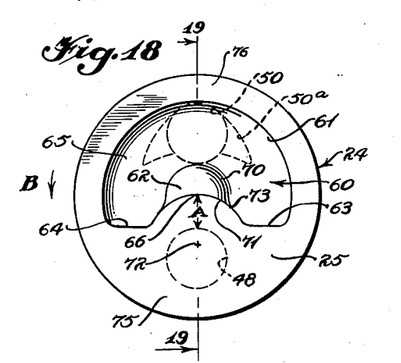
Figure 18 is an elevation of the seat face of the valve member of the invention.

The rotary valve 24 is best illustrated in Figures 18 to 22 and is of circular disc-like form. Figure 18 is an elevation of the planar seat face 25 of valve member 24. This figure also includes a dotted line showing of the supply port 48 and delivery port 50 of the valve body 20, the valve member 24 being shown in the position with respect to those ports which it would occupy in the closed position of the valve.

The planar seat face 25 of valve member 24 includes a generally arcuate groove or flow passage 60 including an outer peripheral wall 61, an inner peripheral wall 62, and end walls 63 and 64. The bottom wall 65 of the groove 60 lies in a plane generally parallel with the seat face 25. The center point or axis of the disc valve 24 is indicated at 66 in Figure 18.

Figure 19:
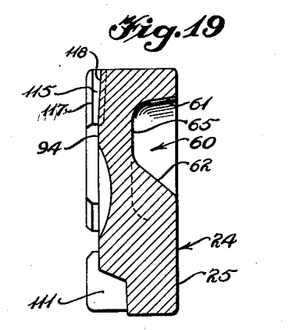
Figure 19 is a central section on the line 19—19 of Figure 18.

The outer peripheral wall 61 of groove 60 is arcuate and is centered at the axis 66 of the valve member. This wall extends through substantially 235° and is preferably inclined at an angle of about 5° to the axis of the valve member as best shown in Figure 19. As a result, the groove is widest at its seat face edge.

One end of the outer peripheral wall joins an end wall 63 and its other end joins end wall 64. The walls 63 and 64 are also inclined at an angle of about 5° to the axis of the valve. It will be observed that the walls 63 and 64 are arranged on a line which extends parallel to the diameter of the disc valve. Stated another way, the outer edges of the walls 63 and 64 are tangential to a circle centered at the axis 66. The inner ends of the end walls join the inner peripheral wall 62.

The inner peripheral wall 62 of the groove 60 includes a bottom edge 70 and an upper or seat face edge 71. Both edges are curvilinear but the wall area between them is inclined to the axis of the valve member as best shown in Figure 19. In more detail, the lower edge 70 is formed on a radius based on the valve axis 66, whereas the seat face edge 71 is formed on a radius based on an axis 72 intermediate the valve axis 66 and the axis of the supply port 48. Stated another way, the seat face edge 71 is based on a radius positioned on a line bisecting the outer peripheral wall 61 of groove 60 but on the opposite side of the valve axis 66 from wall 61. As a result of the relative curvatures of the bottom edge 70 and the seat face edge 71, at its median point shown in section in Figure 19, the inner peripheral wall 62 is inclined at an angle of about 40° to the axis of the valve member and, as shown in Figure 18, on each side of this median point it gradually becomes more sharply inclined until at the points 73 it becomes parallel with the axis of valve member 24. From these points onward it is parallel with the valve axis until it joins the end walls 63 and 64.

As a result of the above-described design of the generally arcuate groove 60, it will be noted that when the valve member 24 is in the closed position illustrated in Figure 18, i. e., when its blank or ungrooved portion 75 overlies the supply port 48, the seat face edge 71 will be concentric with the axis of the supply port and an adequate blank area having a minimum width A will be present between the seat face edge 71 and the adjacent edge of the supply port 48. It will be noted that the point on supply port 48 closest to the periphery of the valve member is spaced from that periphery a distance corresponding to the distance A. Also, the blank area 76 of the seat face positioned between the periphery of valve member 24 and the outer peripheral wall 61 has a corresponding width.

In a typical installation, the valve member 24 may have an outside diameter of the order of .93" and the seat face of the valve body 20 may have a corresponding diameter. The delivery and supply ports 48 and 50 may have a diameter of .221", the outer peripheral wall 61 may be formed on a radius of .352", the bottom edge 70 of inner peripheral wall 62 may be formed on a radius of .119", while the seat face edge 71 of this wall may be formed on a radius of .175" centered at a point .175" from the axis of the valve member. In such case, the distance A will be of the order of .115", which is adequate to prevent escape of gas past the peripheral edges of the valve member or valve body and also to prevent escape from the supply port 48 to the groove 60 with the valve member in closed position.

With the dimensions stated above, the valve member 24 may have a thickness of .310" and the groove 60 will have a depth of .182". With this depth and the radial width indicated above, the groove will have a radial section to accommodate flow between delivery and supply ports of the size indicated.

The valve member 24 may be formed from a brass forging, as is the case with the body member 20. In either event, the shape of the groove 60 enables the valve member to be produced at a low cost.

Other advantages resulting from the above-described form of the groove 60 are hereinafter described in connection with the operation of the entire valve assembly. The rear face structure of the disc is also subsequently described.

Operating mechanism—Single purpose nonlocking valve of Figures 1 to 3

As has been previously stated, the casing 28 is provided with radially projecting ears by means of which it may be secured to the valve body 20. The casing preferably is of sheet metal and cup-shaped in form to include a circular side wall 80 and an end wall 81. The end flange 81 includes a central aperture defined by a circular flange 82 and the stem 26 is journalled in this flange. The central portion 83 of the stem 26 has a diameter to closely fit but be rotatable within the flange 82. Inwardly of the portion 83 (to the right, in the drawings) the stem is of reduced diameter as indicated at 84. Inwardly of portion 84 the stem is still further reduced in diameter as shown at 86 to provide a shoulder 87. As shown in dotted lines in Figure 2, the portion 86 is flat on two diametrically opposite sides as indicated at 88. A stop plate 89 including a central aperture of the same flatted formation as the inner stem portion 86 is thereby keyed on portion 86 and bears against the shoulder 87 provided at the left-hand end of portion 86. A spring spider 92 or driving element is keyed to the stem portion 86 in the same manner as the stop plate 89 and the inner end of stem 26 is peened or headed to lock the plate 89 and spider 92 in position. The outline of spider 92 is shown in dotted lines in Figure 20 and its purpose and detail construction is hereinafter described.

A coil spring 93 of helical form has its outer and smaller end bearing on the central portion of spider 92, the inner and larger end of the spring bearing on the inner wall of a circular recess 94 on the rear face of the disc valve 24.

The stop plate 89, throughout the major portion of its periphery, is provided with an axially and outwardly projecting flange 102. The outer circumferential surface of the flange is of a radius closely corresponding to that of the inner side surface of casing 28 so that the flange serves to center the inner end of the valve stem with respect to the casing and minimize wobbling of the valve stem. While flange 102 is interrupted at several points, as indicated in Figure 2, and as hereinafter described, it essentially extends for about 250° and terminates in shoulders 103 and 104 adapted to cooperate with opposite sides of a band 102a struck in from the side wall of the casing 28. The contact of the shoulders 103 and 104 with band 102a thereby limits the rotation of the valve stem 26 and the valve disc 24.

Plate 89 is also provided with tongues 105a, 105b and 105c struck out of the plate as indicated in Figure 2 so that they extend parallel to the plate axis. The striking out of the tongues 105a and 105b serves to interrupt the flange 102 as referred to above. As is indicated by the dotted line showing of the tongue 105c in Figure 1, the outer ends of the tongues are of reduced width and the tongues are rounded at their extreme outer ends. It will be noted from Figure 2 that the tongues are spaced increased distances from the axis of the plate 89 successively in a counter-clockwise direction, beginning with the tongue 105c.

The stop plate 89 also includes an inwardly projecting tongue 110 extending at an obtuse angle with respect to the body of the plate and into a pocket 111 on the rear face of the valve member 24. The purpose of this arrangement is to generally orient the valve member 24 with the operating structure 27 during assembly.

Figure 12:
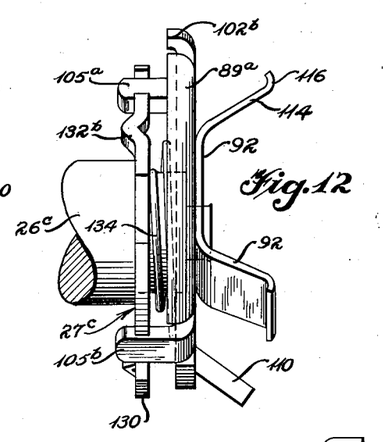
Figure 12 is an elevation of the operating mechanism illustrated in Figures 9 to 11, with the mechanism removed from the remainder of the valve structure.
Figure 20:
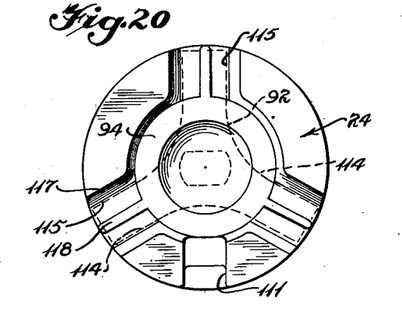
Figure 20 is an elevation of the rear face of the valve member.

As is indicated in dotted lines in Figure 20, the spider or driving element 92 includes a central body portion and three radial arms 114. Element 92 is formed of spring metal and is so designed that when the arms 114 are free, as shown in Figure 12, for example, they will project from the body portion of the spider at a relatively sharp angle. Therefore, when assembled with the valve element 24, they will be under tension as indicated in Figure 1.

Figure 21:
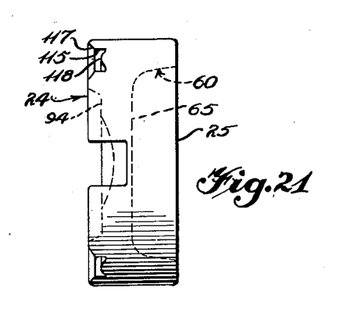
Figure 21 is an edge view of the valve member, the view being taken looking toward the bottom edge of Figure 20.

As has been stated above, and as is indicated in Figures 20 and 21, the rear face of valve member 24 is centrally recessed as indicated at 94. Three equidistantly spaced grooves 115 extend from the outer periphery of the rear face of the disc valve to the recess 94. As is indicated in Figure 1, the outer ends of the arms 114 of spider 92 engage the grooves 115.

Figure 22:
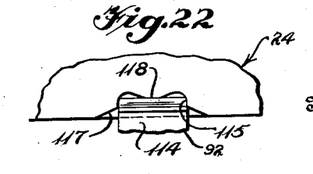
Figure 22 is a fragmentary detail view of the valve member and the valve driving element.

As best shown in Figure 12, the outer or free end of each arm 114 is curved slightly outwardly and upwardly to provide a roll as indicated at 116. As shown in Figures 20 and 22, each groove 115 of valve member 24 is of a width to closely correspond with the width of an arm 114. However, the outer corners of the grooves 115 may be beveled as indicated at 117. The bottom wall of each groove includes a centrally and longitudinally extending rib 118 on which the rolled ends 116 of the arms 114 engage. It will be noted from Figure 22 that the bottom walls of the grooves 115 and the ends 116 of the arms 114 only engage over the area of the rib 118, thereby reducing friction between the arms when the spider is pressed close to the valve 24 as shown in Figure 1 and so that the arms slide along the length of the grooves. In order to further assist this sliding movement, the bottom walls and ribs 118 may be very slightly inclined so that the grooves are of greater depth at their outer ends than at their inner ends.

As has been stated above, and as is shown in Figure 22, the width of the grooves 115 is such that the arms 114 fit closely against the side or lateral walls of the grooves. This fit comprises the primary driving connection between the stem 26 and the valve member 24. However, should spider 92 break, the disc valve 24 can be rotated by the tongue 110 until a new spider is supplied. It will be noted that spider 92 also serves to hold disc valve 24 firmly seated and presses the stop member 89 toward the end wall of casing 28. Spring 93 serves the same purpose and will be effective should the spider break.

As is shown in Figure 1, the spider arms 114 engage the grooves 115 at points closely adjacent the periphery of the valve member 24. In prior constructions, valve members of this type have been connected to the operating stem by having a central socket in the valve keyed to an operating stem of small diameter. Manufacturing tolerances at that point could result in a substantial arcuate movement of the valve periphery with respect to the stem. By the arrangement of my invention, the same tolerances will permit little, if any, arcuate movement of the valve and more accurate control of the gas flow is thereby afforded.

Figure 15:
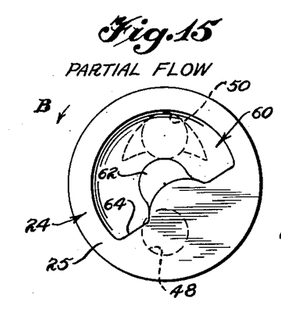
Figures 15, 16 and 17 are diagrammatic and show flow positions of the rotary valve member of the invention.
Figure 16:
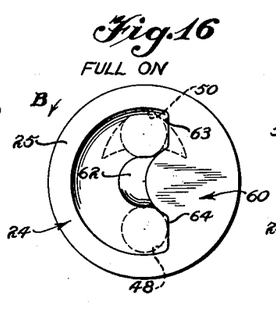

When the valve operating elements and valve are in the position shown in Figures 1 and 2, the passage 60 of the valve member 24 will occupy the position indicated in Figure 18 with respect to the supply port 48 of the valve body 28. Hence, no flow of gas will occur. It will be observed from Figure 2 that at this time the shoulder 103 of disc flange 102 will be in engagement with one side of the struck-in band 102a. To produce gas flow, stem 26 will be rotated in a clockwise direction with respect to Figure 2, viz., in the direction of the arrow A. Bearing in mind that Figures 15, 16, 17 and 18 are views looking at the seat face 25 of valve member 24 from the right in Figure 1, rotation in the direction of the arrow A in Figure 2 will result in rotation of the valve member in the direction of the arrow B in each of Figures 15 to 18. Rotation of about 40° from the Figure 18 position will cause the leading end 64 of passage 60 to overlap the supply port 48 with the result that there will be a partial flow of gas to the burner. The gas flow can be increased as desired until the full "on" position illustrated in Figure 16 is reached. At that time, the stop shoulder 104 will contact with band 102a to limit further rotation of the stem and valve member.

It will be observed that in all positions of the valve member 24 of Figures 1 and 2, the ends of the tongues 105a, 105b and 105c will bear against the inner surface of the end wall 81 of valve casing 28 to thereby hold the stem against movement upwardly of the casing and thus form an abutment for the spring driving element 114 and the coil spring 93.

It will be clear from the above that the valve of Figures 1 and 2 is a non-locking valve primarily useful for obtaining a partial flow and then a full flow of gas.

By providing the single purpose non-locking valve of Figures 1 and 2 with the tongues 105a, 105b and 105c, the casing 28 used with that valve can be of the same axial length as the casings used with the forms hereinafter described and with springs 92 and 93 maintained under the same compression as in the later described valves.

In order to modify the valve of Figures 1 and 2 for counterclockwise operation, the only change necessary is to so locate the stop and guiding flange 102 with respect to the remainder of the elements on disc 89 that shoulder 103 will engage the opposite side of the stop strap 102a in closed position and the cap between the shoulder 103 and shoulder 104 will extend clockwise therefrom as viewed in Figure 2. Therefore, a disc 89 for use in a counterclockwise valve can be produced by very simple changes in manufacturing procedure and without the necessity of any special dies.

Figure 4:
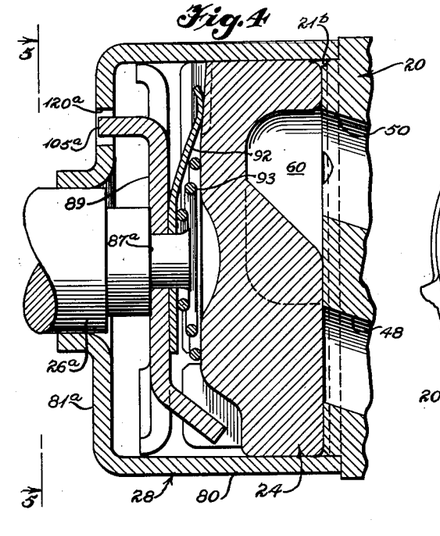
Figure 4 shows a second form of operating means, the view being on the line 4—4 of Figure 5.
Figure 5:
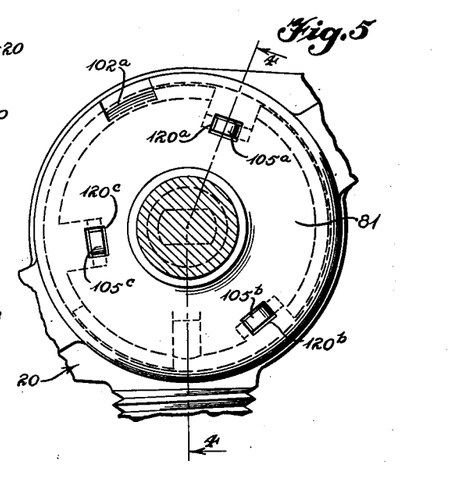
Figure 5 is a view on the line 5—5 of Figure 4.

*The single purpose locking valve of Figures 4 and 5*

The valve of Figures 4 and 5 differs from that of Figures 1 and 2 in that the end wall 81a of its casing 28 is provided with apertures 120a, 120b and 120c through which the reduced ends of the tongues 105a, 105b, and 105c will respectively project when the valve is in the closed position illustrated in Figures 4 and 5. It will be noted from Figure 5 that the apertures 120a, 120b and 120c are so positioned, both radially and circumferentially of the casing and wall, as to accommodate this action.

As a result of the above, the valve member 24 used in the structure under discussion can be locked in "off" position. Unlocking is accomplished by forcing the stem 26a inwardly, thereby releasing the tongues from the casing apertures. Then the stem and valve member can be rotated through 90°, just as has been described above in connection with the valve of Figures 1 and 2 and as is illustrated in Figures 15 and 16.

When the ends of the tongues 105a, 105b and 105c are positioned in the apertures of the casing and wall 81a, as shown in Figure 4, the disc 89 obviously will be at a greater distance from the rear surface of valve disc 24 than when the ends of the tongue are in non-locking position; i. e., bearing on the inner surface of the end wall 81a. Hence, the springs 92 and 93 theoretically will be exerting less pressure against the valve disc to hold it seated. However, the entire valve structure is relatively small, the outside diameter of casing 28 being approximately 1 inch. Hence, the actual distance between the inner face of the disc 89 and the outer face of the valve disc 24 is less than 1/8" with the disc in locking position, while the axial movement of the disc required for locking is 1/32" to 1/16". Therefore, the springs 92 and 93 obviously will provide substantially the same valve seating pressure in both locking and non-locking positions of the stem.

During axial movement of the stem, the tongues 114 of spring element 92 obviously will slide very slightly radially of the valve disc 24, this movement being accomplished without any drag because of the small bearing area between the spring arms 114 and the valve disc resulting from the provision of the radial shoulders 118. This movement is further assisted by the rounded formation 116 of arms 114 and the slight slope of the shoulders 118 referred to above.

Figure 6:
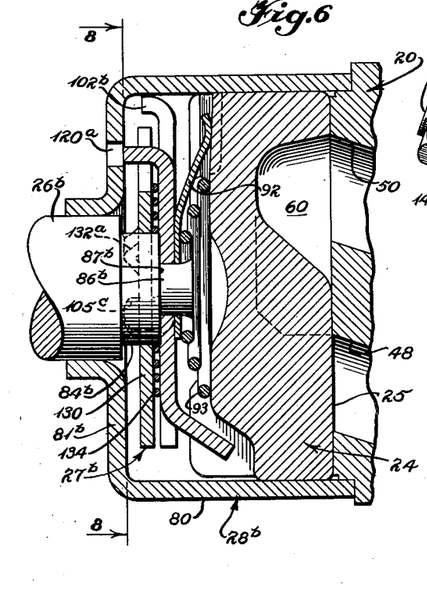
Figure 6 shows a third form of operating means, the view being taken on the line 6—6 of Figure 7, but omitting the handle securing means of Figure 7.
Figure 7:
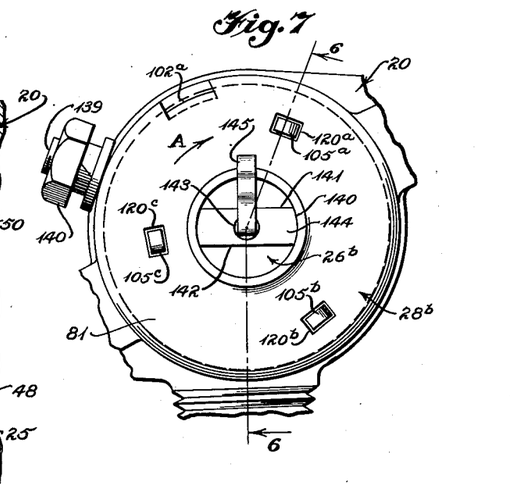
Figure 7 is a front elevation of the valve body shown in Figure 6.
Figure 8:
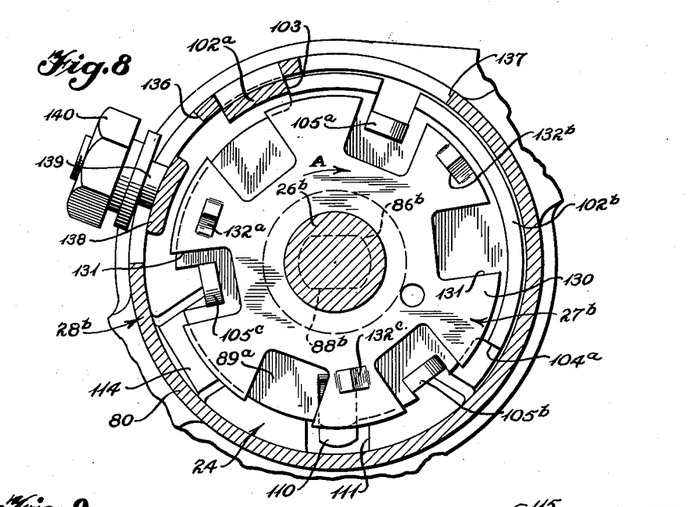
Figure 8 is a section on the line 8—8 of Figure 6.

*High-low non-locking valve of Figures 6 to 8*

The valve disclosed in Figures 6, 7 and 8 differs from the two forms of valves discussed above primarily in that a click plate 130 is provided in the valve now to be discussed. Click plate 130 is mounted on the reduced portion 84b of the stem 26b and has limited rotation on the stem by means of the arrangement best shown in Figure 8. Referring to that figure, it will be observed that the click plate is provided with a plurality of peripheral notches 131, with three of these notches aligned with the tongues 105a, 105b and 105c. The click plate notches are of greater width circumferentially of the structure than the tongues and, therefore, the click plate can rotate with respect to the stem 26 and the stop plate 89 to that extent.

The purpose of providing six notches in the click plate 130 is to enable it to be used with a valve to rotate counterclockwise, as well as with the clockwise rotating valve under discussion.

As best shown in Figures 6 and 8, the click plate or disc 130 has outward projections 132a, 132b and 132c circumferentially spaced about it, these projections facing outwardly or toward casing end wall 81b and preferably being of V-shaped form as viewed radially of the disc and as shown in dotted lines in Figure 6. These projections may be formed by pressure applied to the plate 85 at the desired points. Three projections are preferably provided and they are equidistantly spaced circumferentially of the axis of the plate. However, as is hereinafter explained, each projection is a different distance from the axis of the plate.

As shown in Figure 8, the click plate 130 is circular in outline, its diameter being slightly less than the inner diameter of the flange 102b of stop plate 89a.

As shown in Figure 6, a relatively flat coil spring 134 is positioned on the stem 26b between the stop plate 89a and the click plate 130. This spring forces the click plate 130 outwardly along the stem and toward the end wall 81b of casing 28b.

It will be observed that when the valve member 24 is in the closed position illustrated in Figure 6, the projections 132a, 132b and 132c are bearing against the inner surface of the end wall 81b of casing 28b. The tongues 105a, 105b and 105c of plate 89a are of insufficient length to reach into the apertures 120a, 120b and 120c of the end wall 81b. In other words, the length of each of these tongues is just equal to the combined thickness of compressed spring 134, click plate 130 and the projections on the click plate. Hence, the valve of Figures 6 to 8 is not locked in non-flowing or "off" position.

The stop plate 89a used in the Figures 6 to 8 construction is the same stop plate as was provided in the form of Figures 1 and 2 and the form of Figures 4 and 5 except that it lacks the reduced end portions provided on the tongues of the earlier figures and has a circumferentially shorter flange 102b. As best shown in Figure 8, flange 102b terminates at 104a to extend through about 135°.

The casing 28b of Figures 6 to 8 is identical with that used in the valves of Figures 1 to 5 except that the side wall 80 of casing 28b is provided with two slots 136 and 137 respectively provided on each side of the struck-in band 102a. These slots extend circumferentially of the casing and are selectively usable to support an adjustable stop element 138 of arcuate form adapted to be positioned on the inner surface of the casing 28b. Stop element 138 includes a shank 139 which extends outwardly through the casing slot and has its outer end threaded to receive suitable washers and a nut 140. When used to control a clockwise moving valve disc, the stop will be positioned in the slot 136, when used to control a counterclockwise moving valve disc, it will be positioned in the slot 137. The exact point at which the stop 138 will be positioned in either slot is adjustable to the lowest maintainable flow of gas, as hereinafter described.

With a counterclockwise valve, flange 102b would be positioned as mentioned above in connection with flange 102 of the forms of Figures 1 to 5.

*Operation of high-low non-locking valve of Figures 6 to 8*

The principal purpose of the click plate 130 is to enable the valve of Figures 6 to 8 to give an indication as to when the gas flow is fully on. Therefore, the click plate can be regarded as an indicating means.

Figures 6 and 7 show the relationship of the tongues 105a, 105b and 105c to the casing 28b when the valve member 24 of Figures 6 to 8 is in closed position. As has been stated above, at this time, the outer ends of these tongues respectively lie behind and clear of the apertures 120a, 120b and 120c in the end wall 81 of the casing 28b. This position is shown in transverse section in Figure 6 and it will be noted from this figure that the spring spider 92 and coil spring 93 act to hold the entire operating assembly 27b away from the rear surface of valve member 24. Spring 134 is not strong enough to resist this action. As shown in Figure 8, in this "off" or non-flow position, the shoulder 103 on the flange 102b of stop plate 89a is in contact with the struck-in strap or shoulder 102a of casing 28b. As is also indicated in Figure 6, the click projections 132a, 132b and 132c will simultaneously bear upon the inner surface of the outer wall 81 of casing 28b, thereby holding the stop plate inwardly so that its tongues cannot enter the casing apertures.

The position of the valve member 24 with respect to the supply port 48 and delivery port 50 of the valve body 20 in closed position is illustrated in Figure 18 and it will be observed from this figure that the blank or non-grooved portion 75 of the valve member 24 overlies the supply port 48.

In order to obtain a flow of gas, the stem 26b is rotated clockwise or in the direction of the arrow A of Figures 7 and 8. Bearing in mind that Figures 15 to 18 view the valve member seat face 25, this rotation of the stem will cause the valve disc 24 to rotate counterclockwise as viewed in Figures 15 to 18, viz., in the direction of the arrow B of the latter Figures. When the position of the valve member 24 with respect to the supply and delivery ports shown in Figure 15 is reached, there will be a partial flow of gas because the end wall 64 of groove 60 will overlap the supply port 48. Assuming that the valve is used with a back-flash pilot light, it will be desirable to continue rotation in a clockwise direction until valve member 24 reaches the position indicated in Figure 16, that is, full flow position. In such position, the supply port 48 will be fully uncovered by the leading end of groove 60, i. e., the end defined by wall 64. At the same time, the rotation of the stem 26b will have carried the click projections 132a, 132b and 132c to such point that they will be in alignment, respectively, with the apertures 120a, 120b and 120c in the wall 81 of casing 28b. Spring 134 will then force the click plate 130 outwardly so that the click projections will engage these apertures as shown in Figure 5, thereby partially preventing further rotation of the stem. It will be observed that this outward movement of the plate 130 will occur by the action of spring 134 and entirely independently of the other springs 92 and 93.

The fact that the click plate 130 is free to have some circumferential movement independently of the stem 26b enables plate 130 to rotate clockwise independently of the stem as soon as the click projections come adjacent the openings 120a, 120b and 120c. In prior structures, the click plate has been fixed to move circumferentially with the operating stem so that the click plate could not spring outwardly until the stem had been turned to the proper position to permit such outward movement. By the arrangement of the present invention, when the apices of the click plate projections reach the edge of an aperture, their rearward surfaces will slide over that edge even if rotation of the stem is stopped. The momentum of the plate and the pressure of the spring 134 also cause such movement, the momentum being increased by the radial spacing of the click projections from stem 26b. In any event, the click plate 130 will spring forwardly and outwardly so that a sharply audible click results.

When the click projections are engaged within the apertures 120a, 120b and 120c, they serve to hold the stem and valve member in a corresponding position. However, the circumferential and axial loose connection of click disc 130 upon stem 26b enables the stem to be turned with minimum effort. More particularly, when the stem is turned in either direction to move the click projections from engaged position with the apertures, contact of the leading sloping surfaces of the projections with the adjacent edge of the apertures causes plate 130 to move inwardly and also trail stop plate or disc 89a. The combination of these two movements, instead of only an inward movement, results in a very smooth release of the projections from the apertures.

When the valve operating arrangement of Figures 6 to 8 is used with a burner connected with a flash-back pilot light ignition system, the audible click will advise the operator that a full flow of gas is moving to the burner so that the pilot should now ignite the burner. If a lower flame is desired at the burner, the valve member 24 may be rotated further in the direction of arrow B as hereinafter described.

Referring to Figure 16, which shows the position of the valve member groove 60 with respect to the supply port 48 and the delivery port 50 when the valve is in fully opened position, it will be observed that in this position the end walls 63 and 64 and inner peripheral wall 62 are so related that movement of gas from supply port 48 to delivery port 50 is in the straightest line possible commensurate with the desirable bracing-rib effect provided by the inclined inner wall 62. That is, gas may flow between the inclined inner peripheral wall 62 and the seat face 21 of the valve body 20 instead of all of the flow having to pass around the fully arcuate portion of the groove as would be the case if the wall 62 were normal to the seat face 21 along a line corresponding to the line 70 of Figure 18. Nevertheless, the inclined wall 62 also serves to reinforce the valve so that groove 60 may be of maximum depth without weakening the valve member. Comparing this advantageous flow path with the fact illustrated in Figure 18 that, in closed position, the formation of wall 62 provides an adequate sealing space or lap indicated by the line A, it will be appreciated that the form of groove provided by the present invention is highly desirable both with regard to sealing effect in closed position and flow of gas in any flow position, but without structurally weakening the valve member.

Figure 17:
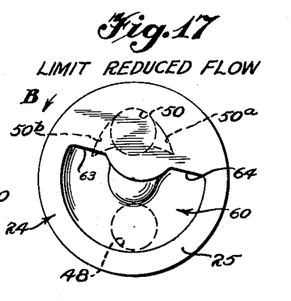

As has been stated above, if a lower flow of gas to the burner is desired, rotation of the valve member 24 in the direction of arrow B of Figures 16 and 17 is continued. The limit position of this movement as transmitted to the valve member 24 is illustrated in Figure 17 wherein the trailing end 63 of the groove 60 overlies the tapered extension or tail port 50b of the delivery port 50. Extension 50b is V-shaped in radial section, but its size circumferentially of the valve member is gradually reduced. As is best shown in Figure 18, one edge of the extension is tangential with respect to the port 50 and its other side edge is at an acute angle to its outer edge. Hence, the extension is generally V-shaped in a plane parallel to the seat face 21.

It will be noted from Figure 17 that end wall 63 of groove 60 is straight where it crosses tail port 50b and that the portions of wall 63 at either side of the tail port are also straight. Hence, if an operator wobbles the valve stem and manages to cause the valve disc 25 to move slightly radially of the valve body member 20, no curved portion of the groove wall can be brought over the tail port. Prior designs have included a curved wall at this point so that radial movement of the valve could decrease gas flow to the extent that the low flame existent at this time would be extinguished but without the gas being shut off. This is highly undesirable with "bottled" or other high B. t. u. gases.

When the valve member 24 reaches the limit flow position shown in Figure 17, the shoulder 104a at the leading end of flange 102b of stop plate 89a will contact with the stop 138 shown in Figure 8. Stop 138 is adjustably secured in slot 136 at the proper position at which a minimum flow of gas may occur to the burner without danger of the flame dying out for lack of gas.

After the operator has turned the valve disc in a clockwise direction from the "off" position of Figure 18 to the full flow position of Figure 17, he may wish to obtain a reduced flow by rotation in a reverse direction, i. e., counterclockwise. In such event, the valve member 24 could be positioned as illustrated in Figure 15, i. e., with the normally leading end 64 of the groove 60 overlapping the supply port 48. Because of the fact that the end wall 64 is straight, such flow can be obtained during a maximum rearward movement of the valve member.

*The high-low locking valve of Figures 9 to 12*

Figure 9:
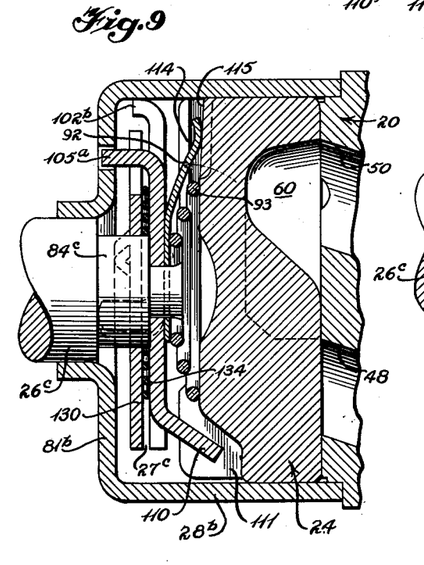
Figures 9, 10 and 11 are transverse sections of a fourth form of valve operating means, the successive views showing different positions of the operating means.
Figure 10:
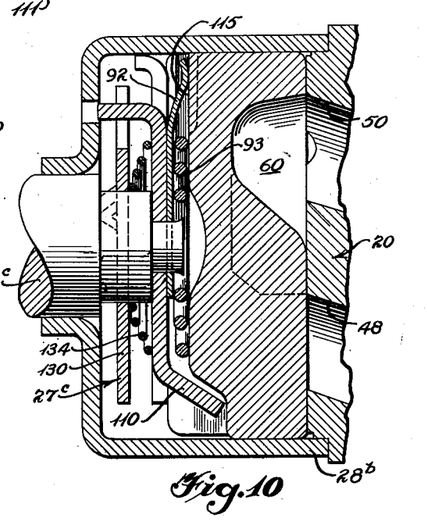
Figure 11:
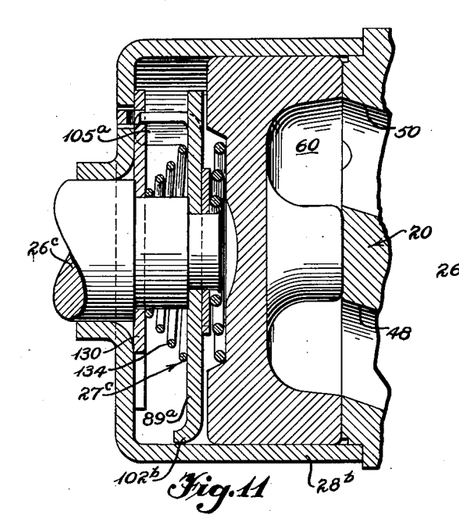

The valve shown in Figures 9 to 11 and the operating mechanism 27c of Figure 12 is identical with the valve of Figures 6 to 8 except for slight differences which enable the valve now to be described to lock in non-flow position.

These differences involve having the tongues 105a, 105b and 105c of sufficient length that when the valve is in the closed position illustrated in Figure 9, the tongues will project into the apertures in the end wall 81b of casing 28b. The casing 28b is identical with the casing of Figures 6 to 8. The stem 26c of Figures 9 to 12 has a longer intermediate reduced portion 84c so that the click plate 130 will have a wider range of movement.

In order to release the valve from the locked position shown in Figure 9, the stem 26c is pressed inwardly against the action of the spring spider 92 and the coil spring 93, the spring 134 then urging the click plate 130 toward the end wall of the casing 28b as shown in Figure 10. The valve may then be rotated to full "on" position whereupon the click plate 130 will be urged forwardly by spring 134, as shown in Figure 11, to move into the apertures 120a, 120b and 120c as hereinbefore described in connection with the valve of Figures 6 to 8.

The manner of controlling the gas flow with the valve of Figures 9 to 12 is identical with that described above in connection with the valve of Figures 6 to 8.

It will be observed that the valve stem 26c and the remainder of the operating elements, as well as the valve member 24, make a rotation of about 170° between the "off" position illustrated in Figure 18 and the extreme low position illustrated in Figure 17. Assuming that each click projection 132a, 132b or 132c is spaced about 90° behind the next adjacent leading projection or tongue 105a, 105b or 105c as indicated in Figure 8, it will be obvious that a 125° rotation will carry each lock projection past an aperture 120a, 120b or 120c in the casing 28c. However, as has been explained above, any particular click projection and the lock projection immediately in advance thereof can only engage one aperture. For example, as shown in Figure 8, the click projection 132a and lock projection 105a are spaced the same radial distance from the axis of the stem 26c as the casing wall aperture 120a so that they will only engage in that aperture, and when these projections come opposite other apertures they will be out of radial alignment therewith.

*Valve handle securing arrangement of Figures 1 and 7*

As is best shown in Figures 1 and 7, the stem of each of the valves described has its outer end 140 of the same diameter as the central portion 83. However, portion 140 is cut away at two sides to form parallel flat surfaces 141 and 142 and a round pocket 143 is drilled in the end 144 co-axial with the axis of the stem. A handle securing means generally designated by the numeral 145 is placed in the pocket 143, member 145 being formed of spring steel stock. One leg 146 of member 145 is straight and has a return bend therein so that the corners of the extreme end 147, which is cut square, will grip or bite into opposed points of the circular pocket 144. The tendency of the return bend to spread will assist this gripping action. Hence, member 145 will be securely held against removal. Member 145 includes a portion 148 which extends at right angles to the leg 146 and a portion 149 extends from portion 148 in the same direction as leg 146 as shown in dotted lines in Figure 1.

The upper dashed showing of Figure 1 is the normal condition of the member 145 and it will be observed from this showing that its curved or bowed portion 149 normally extends outwardly beyond the periphery of the portion 83 of stem 26. A handle 29 to be fitted on stem 26 will have a socket therein including a flat portion to fit the flat surface 142 on the stem, the remainder of the socket wall being circular on a radius equal to that of stem portion 83. When the flat portion of the handle socket engages the flat surface 142 on the stem 26, the handle will be keyed to the stem and also will be held in tight engagement therewith by the resiliency of the curved portion 149 of element 145, that curved portion then being bent substantially to the slightly flattened shape shown in solid lines in Figure 1.

The element 145 is sufficiently stiff that it will exert enough pressure radially of the stem to lock the handle in position against movement axially of the stem. Because the arched portion 149 of element 145 is bearing against the portion of the handle socket which is of the greatest dimension, rotation of the handle upon the stem will be resisted.

The provision of the two flat surfaces 141 and 142 on stem 26 enables member 145 to be mounted to face either upwardly or downwardly.

Referring again to the peripheral recess 21a shown in Figure 1, this may be a bevel as indicated at 21b in Figure 4. In the assembly of a casing 28 with a body 20, one of the screws 56a or 56b of Figure 3, usually of the self-threading type, is first threaded into the aperture of the corresponding ear 56 or 57. During this application, casing 28 may swing on the screw as a pivot. If a burr left in final grinding or finishing of seat face 21 could project past the periphery 21c of seat face 21, this movement of the casing would bend the burr up over the seat face. By providing the recess 21a or bevel 21b, any burr left after finishing will be so positioned that periphery 21c will prevent the burr from being struck by the casing.

It will be noted from the dimensions hereinbefore set forth that the present valves have overall dimensions comparable to those of the usual gas range plug type valve but, nevertheless, give a volume of gas flow corresponding to that of the usual plug valve.

The terminology used in the specification is for the purpose of description and not of limitation, the scope of the invention being indicated in the claims.

I claim:

1. In an operating mechanism for a gas range valve, an apertured casing member, a stem mounted for rotary movement with respect to the casing member, a disc fixed to said stem, a second disc rotatable on said stem, means to limit the rotation of said second disc with respect to said stem, resilient means to urge said second disc axially of said stem toward the apertures of said casing member, means on said first disc adapted to engage an abutment on the casing member and thereby limit rotation of said stem, and means on said second disc to engage the apertures in the casing member.

2. In an operating mechanism for a gas range valve, an apertured casing member, a stem mounted for rotary movement with respect to the casing member, a disc fixed to said stem, a second disc rotatable on said stem, means to limit the rotation of said second disc with respect to said stem, resilient means to urge said second disc axially of said stem toward the apertures of said casing member, means on said first disc adapted to engage an abutment on the casing member and thereby limit rotation of said stem, and means on each of said discs to engage the apertures in the casing member, the last-named means on one disc being offset with respect to the aperture-engaging means of the other disc.

3. In combination, a valve body, a valve member rotatable with respect to said body, an apertured casing member fixed to the valve body, a stem mounted for rotary movement with respect to the casing member, a disc fixed to said stem, a second disc rotatable on said stem, means to limit the rotation of said second disc with respect to said stem, resilient means to urge said second disc axially of said stem toward the apertures of said casing member, means on said first disc adapted to engage an abutment on the casing member and thereby limit rotation of said stem, means on said second disc to engage the aperture in the casing member, and means carried by said stem to detachably engage the valve.

4. A mechanism of the character defined in claim 3 wherein the valve member is of disc form and said stem-carried means engages the valve adjacent its periphery.

5. In a valve structure, a valve body, a valve member rotatable with respect to said valve body, a casing fixed to said valve body and including an apertured end wall, a stem rotatable in said casing, a disc secured to said stem, cooperating means on said casing and disc to limit the rotation of said stem, a second disc rotatable on said stem, means on said second disc to engage the aperture in said end wall, means to urge said second disc axially of said stem and toward the end wall of said casing, cooperating means on said two discs whereby rotation of said second disc with respect to said stem will be limited, and means carried by said stem to engage said valve member.

6. In a valve structure, a valve body, a valve member rotatable with respect to said body, a casing fixed to said valve body and including an apertured end wall, a stem rotatable in said end wall, operating means between the stem and said valve member, including engageable projections, a disc fixed to said stem, cooperating means on said disc and casing adapted to limit rotation of said stem with respect to said casing, a second disc limitedly rotatable with respect to and mounted on said stem between said first disc and said end wall, means carried by said first disc to engage the aperture in the casing end wall, a resilient means positioned between said first disc and said valve member to urge said disc aperture engaging means toward said casing end wall, means on said second disc to engage the end wall aperture, and means between said discs to urge said last-named means into engagement with the wall aperture.

7. In a valve structure, a valve body, a valve member rotatable with respect to said valve body, a casing fixed to said valve body and including an apertured end wall, a stem rotatable in said wall of the casing, operating means between the stem and said valve member, including engageable projections, a disc fixed to said stem between said end wall and said valve member and including a tongue projecting toward said wall and adapted to engage the wall aperture, resilient means between said disc and said valve member to urge said disc toward said casing end wall, a second disc carried by said stem and movable with respect to said first disc, said second named disc including means to engage the aperture and having an aperture therein surrounding the tongue of said first disc, and means to urge said second disc toward said end wall.

8. A valve structure of the character defined in claim 7 wherein the end wall of the casing is provided with a plurality of apertures circumferentially spaced with respect to said stem and with each aperture at a different radial distance from the stem axis, said first disc is provided with a plurality of tongues spaced corresponding distances from the stem axis, and said second disc is provided with a plurality of aperture engaging means spaced corresponding distances from the stem axis.

WILLIAM ROBINSON.

References Cited in the file of this patent

UNITED STATES PATENTS

| Number | Name | Date |
|---|---|---|
| 477,706 | Rymer | June 28, 1892 |
| 919,443 | Lewis | Apr. 27, 1909 |
| 1,395,001 | MacDonald | Oct. 25, 1921 |
| 1,786,330 | Berkeley | Dec. 23, 1930 |
| 2,069,017 | Pratt | Jan. 26, 1937 |
| 2,126,020 | Leach | Aug. 9, 1938 |
| 2,142,368 | Mueller | Jan. 3, 1939 |
| 2,215,248 | Murphy | Sept. 17, 1940 |
| 2,220,346 | Mueller | Nov. 5, 1940 |
| 2,344,956 | Alber | Mar. 28, 1944 |
| 2,361,655 | Robinson | Oct. 31, 1944 |
| 2,362,364 | Dusevoir | Nov. 7, 1944 |